W. P. Wood,
Scroll Sawing Machine,
No. 365, Reissued Mar. 25, 1856.
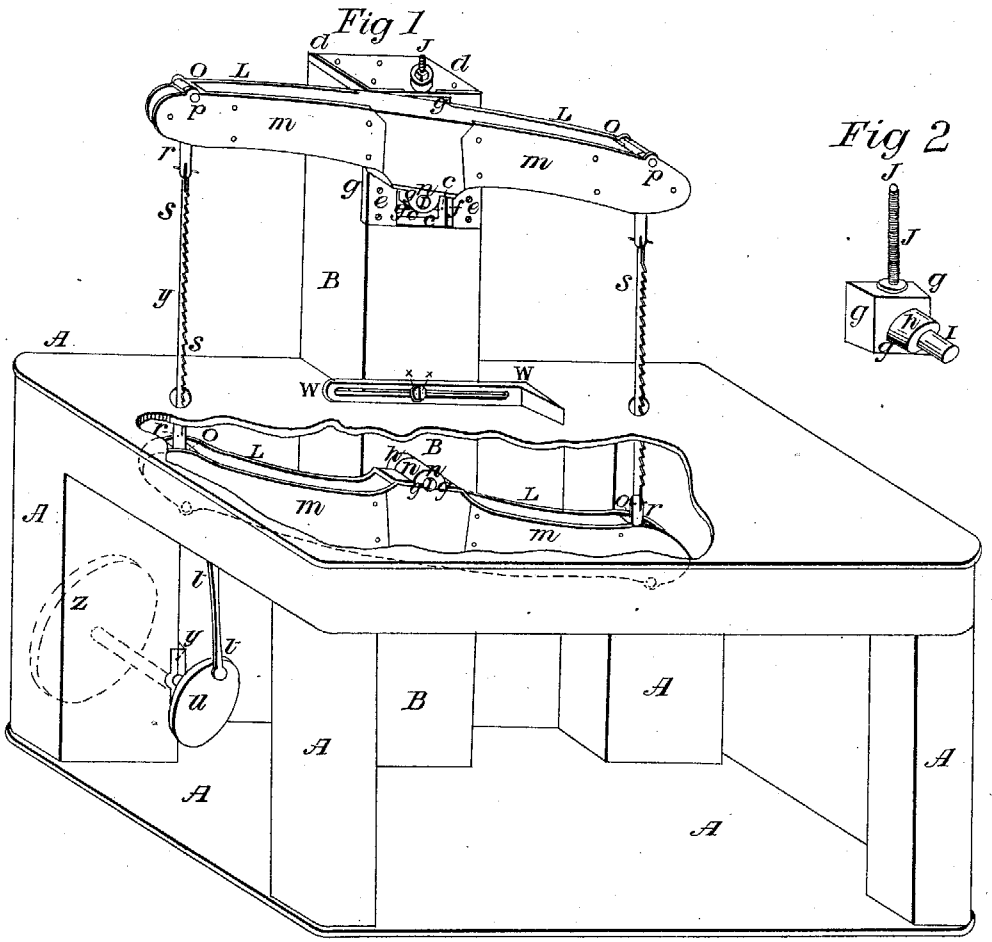
AM. PHOTO-LITHO. CO. N.Y. (OSBORNE'S PROCESS)

UNITED STATES PATENT OFFICE.

WILLIAM P. WOOD, OF WASHINGTON, DISTRICT OF COLUMBIA, ASSIGNOR, BY MESNE ASSIGNMENTS, TO W. P. WOOD.

IMPROVED SAWING-MACHINE.

Specification forming part of Letters Patent No. 14,339, dated February 26, 1856; Reissue No. 365, dated March 25, 1856.

*To all whom it may concern:*

Be it known that I, WILLIAM P. WOOD, of Washington city, in the county of Washington and District of Columbia, have invented and made certain new and useful Improvements in the Method of Hanging, Straining, and Operating Saws; and I do hereby declare that the following is a full, clear, and exact description of the method of construction and mode of operating the same, reference being had to the accompanying drawings, and making a part of this specification, in which—

Figure 1 is a perspective view of the apparatus complete, showing a fragment taken from the top of table, the better to show the apparatus; B B B, an upright or column; C C C C, a recess or socket-chamber; *d d d d*, a metallic cap-piece having a facing stay-plate, *e e e e; f f*, thickness or edges of the plate; *g g*, sliding socket-block; *k*, an adjusting screw-tap or wrench screw-nut; *i i*, fulcra or axes; *h*, a collar-washer; *j*, the elevating or straining screws; L L L L, the rocking beams with metal facings *m m m m m m; n n n*, axis or fulcrum-boxes; *o o o o*, mortises; *p p*, swivel-bearings; *g g g g*, centers of the beams or rocking arms; *r r r r*, connecting-rods or swivel-bearings; *s s s s*, saw-blades; *t t*, the pitman or motion rod; *u*, the crank or eccentric motion wheel; *w w*, the graduated reversible scale-gage; *x x*, the slide-bolt of gage; *y*, the journal-boxes of the driving-wheel *z*.

Fig. 2 shows the elevating device or saw-straining socket-block with bevel sides *a a*, the collar-washer *b b*, the axle *c*, the elevating-screw J J.

To enable others to be skilled in the use and application and to make and construct my invention and improvements, I herewith proceed to describe the construction and operation thereof, the nature and principles of which consist in constructing a saw table, stand, or frame-work of any desired form, the diagram Fig. 1 showing a simple plan for light work, as A A A A A, and attaching thereto an upright beam or vertical post or column, B B B B, in which is formed on the front side a recess or socket-chamber, C C C. On the top end of this column is screwed a metallic cap-piece, *d d d*, having a front facing-plate, *e e e*, extending downward over and let into and on a level with the front of the upright B B B, and screwed thereto or fastened in any secure manner. The edges *f f* of this plate answer as a sliding-surface for the beveled adjustable sliding tension socket-block *g g*, which is formed with a square body with beveled sides, to prevent working or forcing out of its place. (Shown in Fig. 2.) This block or adjusting tension device conforms in size to the recess C C. Formed on this block is fixed washer or collar *h*, and proceeding therefrom horizontally is a stem or axle or the beam-fulcrum, *i*. From the upper part of this sliding socket tension-block proceeds vertically a screw, J, of desired length, fitted to which is a screw tap or nut, K, which may be made to work by hand, a wrench, key, or otherwise.

Having thus formed the sawing table or framing complete, I next have formed two beams or rocking arms, L L L L L, necessary, of equal size and exact length, arranged with metallic facings *m m m m*. These beams or rocking arms can be made of wood or entirely of metal, and hollow, if desired. Through each end of the rocking arms, at equal distances from the center or axis, are vertical mortises *o o o o*, and transversely through these mortises are swivel-bearings *p p p p*. Inserted midway of each rocking arm or beam are centers Q Q. The arm or beam No. 1 is hung on the movable or adjustable axis *i*, while the arm or beam No. 2 is hung on a stationary or fixed axis, *i*, formed on a plate which is screwed onto the upright or column B B B, or affixed in any suitable manner.

Thus having given the principal features of the construction of my sawing apparatus, I next attach any ordinary saw-blades by the connecting-rods *r r r r*, having eyes through which run the swivel-bearings *p p p p*, passing through the ends of the arms or beams, thus forming a connection of the arms Nos. 1 and 2 with the saw-blades *s s s s*. This being complete, in order to set the saws in motion all that is requisite is to form a connection by a vertical pitman or rod, *t t*, attached by a pivot-pin or otherwise to one end of the lever arm or beam No. 2. This connection rod or pitman is attached to a crank or eccentric, *u*, which may be set in motion by any gearing, band, or other driving power.

The operation of my sawing-machine is as follows: Being set in motion, it will be perceived that there is an alternating or rocking motion of the ends of the arms or beams, which beams being hung parallel to each other on centers or axes situated in the same vertical line must necessarily give to each beam or arm the same corresponding play and motion, and though the ends of the arms describe the arc of a circle, the saw-blades being of the same length, and hung or suspended on compensating pivots or swivel-bearings *p p p p*, which are at equal distances from the axes *i i*, do not admit of any (supposed) variation laterally from right to left; but, on the contrary, by aid of the compensating pivots or swivel-bearings the saw-blades have a direct vertical or up-and-down play or stroke. Consequently there can be no veering or lateral swaying in the cutting, which would make the kerf or rift irregular and rough. After the saw-blades are attached as described, the straining or tightening of them both is accomplished simultaneously and equably by screwing down the adjusting or elevating screw tap or nut *k*, which operation elevates or screws up the tension socket-block *g g g*, upon which is hung the arm or beam No. 1, and thus is most effectually and with regularity accomplished the equable straining of two or more saw-blades by the aid of one simple appliance and in one operation.

It may be well to remark that a second set of arms or beams and saws can be arranged opposite to each other, or upon each side of the upright or column, thus making a double sawing apparatus, which can be operated by the same crank or motion.

The many advantages possessed by my system of straining and operating saws are as follows, viz: simplicity, cheapness, and durability of construction; secondly, two or more saws may be set in motion and double sawing carried on at the same time without multiplying the resistance or requiring double power to set the saws in motion, for it will be observed that as the saw-blade *s x s* cuts downward the other saw, *s y s*, is going up, doing no cutting. Then when the saw *s x s* draws up, the saw *s y s* is cutting downward, and thus sawing is done alternately if two pieces of timber are being cut, or double sawing done at one operation of the machine. As the saw-blades have a short play or sweep, they must necessarily move quicker, and consequently a greater number of cuts and faster sawing done, even by the same motion, than if the crank or eccentric were made to describe a greater circle. Again, with my system of working saws I am enabled to cut through a space much greater than the extent or mere distance of the stroke or sweep of each saw-blade. Besides, too, the danger of gumming or choking of the saws is overcome readily, notwithstanding they move vertically, for as the blade cuts down each tooth takes with it its respective cutting or particle, which, if not thrown out or dislodged in the going down of the blade, must be detached as the blade goes up, and consequently every succeeding cut thereafter pushes out the preceding chip or particle. Now, if the saw-blade operated by my mode moves only six inches, and each tooth should cut an inch, the whole number of inches six, but the timber or stuff to be cut through should be twelve inches, therefore it would appear that, as the saw moved only six inches, six inches of matter only could be detached, whereas such is not the case, for if one part of the saw moves six inches the whole length of the saw must move six inches through space or distance. Therefore if the stuff or timber to be sawed should be twelve inches thick, twelve inches length of saw must cut. Then in order to relieve the kerf or rift of the detached particles as the saw cuts down, six inches of matter or dust would escape clear out of the kerf, and six inches would remain within the teeth of the last six inches of saw-blade; but as the saw moves upward the last six inches of detached matter is dislodged in going up, and then as the saw descends again to make another cut the last detached matter is forced out by the succeeding cut of the saw, and consequently, though the actual cut or stroke of the saw be less than the thickness of timber cut, still there is no danger of the saw-blades choking, or the kerf or rift remaining clogged, unless the timber should be greater than the capacity or strength of saw-blade.

My saw-mills are particularly well adapted to the use of cabinet-makers, carpenters, and joiners, carriage and wagon makers, and wheel-wrights, or for any architectural purposes where straight or scroll or curvilineal sawing is required.

Connected to the upright B B B is a reversible adjustable timber-gage, which may have a regular inch-scale formed on it, for convenience. This gage, when not in use, can be thrown up vertically out of the way, or used for either saw when required. I will here remark that this reversible gage may be attached to any suitable device secured to the saw-table top, by which means it may be made to accomplish the same purpose.

Having given a full, clear, and accurate description of my system or mode of hanging and straining and operating saws, what I claim as new or original with myself, and desire to secure by Letters Patent of the United States, is as follows:

1. Attaching saws to parallel rocking beams by means of swivel-bearings.

2. The reversible graduating scale-gage, in combination with the saw-table, substantially as set forth.

Witnesses: WILLIAM P. WOOD.
JOHN S. GALLAHER, Jr.,
ED. A. GALLAHER.